Aug. 5, 1952 E. M. JONES 2,605,556
RADAR SYSTEM OPERATIONAL TRAINING SYSTEM
Filed April 30, 1946 2 SHEETS—SHEET 1
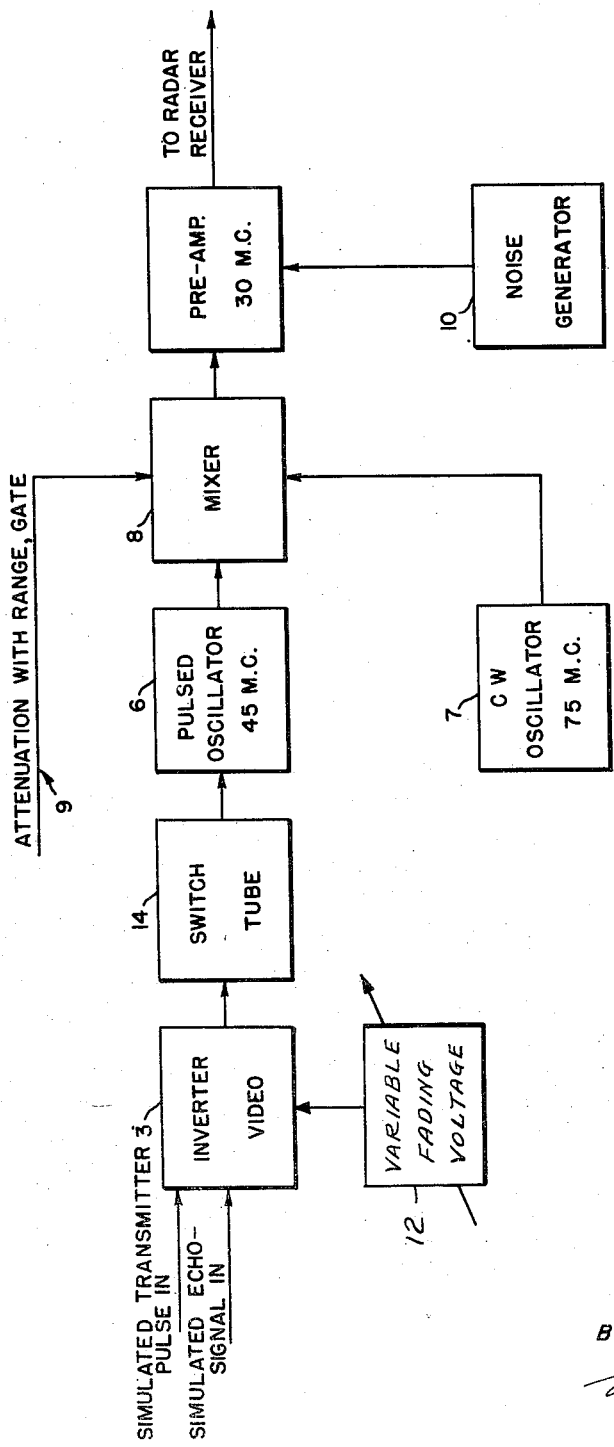
FIG. I
INVENTOR
EDWARD M. JONES
BY
William D. Hall,
ATTORNEY

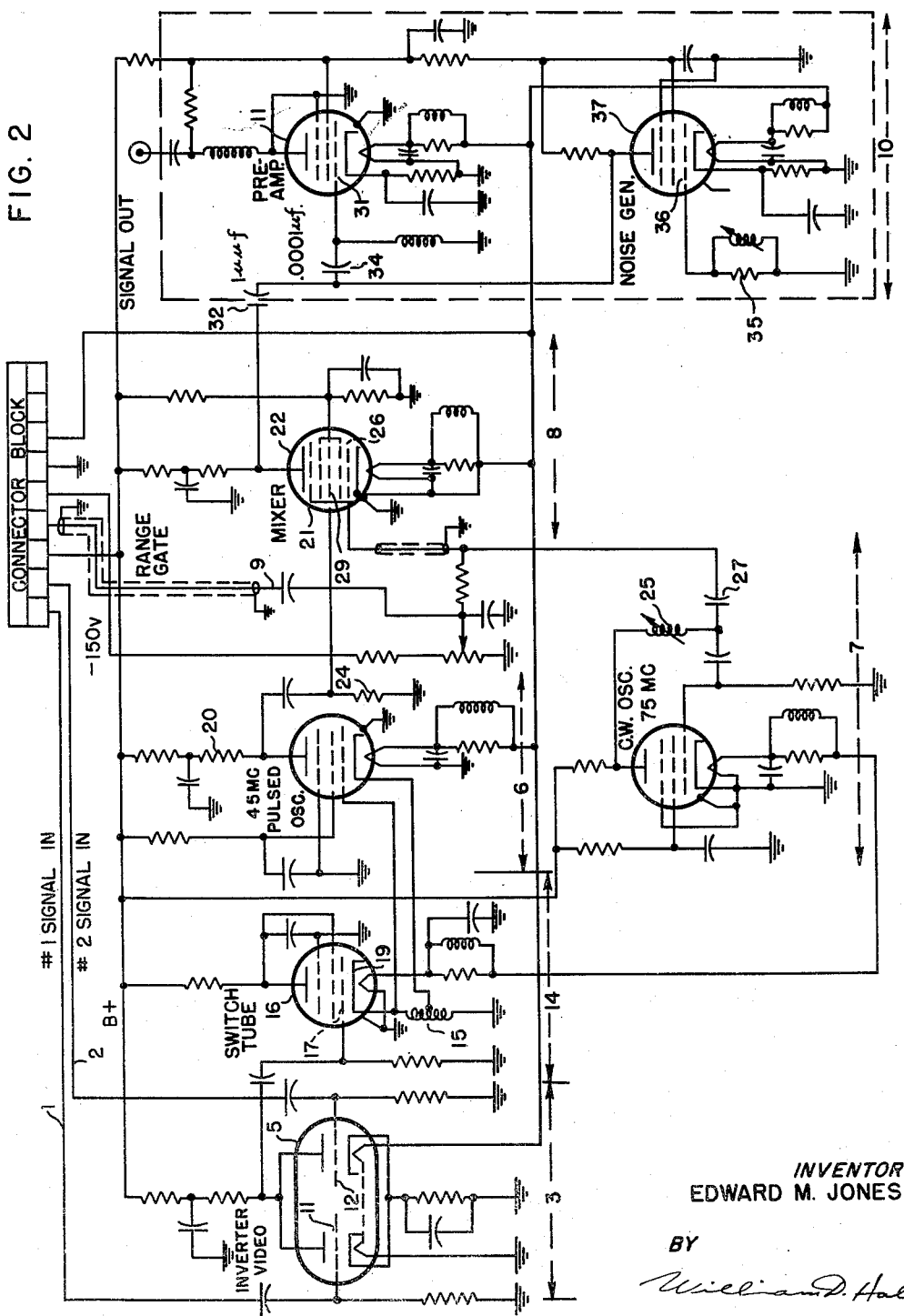

Patented Aug. 5, 1952

2,605,556

UNITED STATES PATENT OFFICE 2,605,556

RADAR SYSTEM OPERATIONAL TRAINING SYSTEM

Edward M. Jones, Hanover, N. H., assignor, by mesne assignments, to the United States of America as represented by the Secretary of War Application April 30, 1946, Serial No. 666,022

1 Claim. (Cl. 35—10.4)

This invention relates to radar training equipment and particularly to means for simulating realistically incoming radar signals.

It has been found desirable in developing radar operations to use training sets into which are introduced artificially produced signals corresponding as closely as possible to the signals received during normal operation. These artificially produced, or synthetic video signals have been fed into the video amplifier of the radar set receiver, which usually utilizes a superheterodyne circuit. The results have been unsatisfactory, however, because noise is either not present, or is incorrectly combined with the signals, and the gain control does not function normally and various other factors make the operation as learned on the trainer dissimilar to that experienced under operating conditions.

The present invention provides means for converting synthetic video pulses into proportional I.-F. pulses. These in turn are fed into the I.-F. amplifier of the radar set instead of the signals normally taken from the first detector. The apparatus for accomplishing this purpose, which will be called a "modulator," permits the proper saturation effects to take place in the I.-F. portion of the radar set, and allows normal operation by the trainee of the gain control, which is an important element in training for the operation of equipment of this type. It provides the proper noise interference, for the trainee must become accustomed to identifying signals during the presence of interference, a part of which is noise produced in the receiver itself. Gain control is also provided by means of which the instructor can vary the signal strength at will, including its reduction to a value well below the noise level.

The invention has been illustrated in the drawing, in which:

Fig. 1 is a block diagram of a training unit incorporating the invention; and

Fig. 2 is a schematic circuit diagram of the training unit.

The basic elements to accomplish the objects explained above are an oscillator to produce the I.-F. current, switching circuit to modulate the synthetic video pulses onto the I.-F. current, and an attenuator. Certain other elements are added as described hereafter to accomplish additional functions. The elements are shown generally in the block diagram of Fig. 1 and correspondingly numbered arrows are used in Fig. 2 to indicate roughly the extent of the circuit elements shown in blocks in Fig. 1.

The synthetic video signals are applied to the circuit through leads 1 and 2 connected to an inverter video section 3 having a double triode 5 of the 6SN7-GT type. In tube 5 two independent signals may be mixed while the video signal is amplified and inverted. In some cases a blocking oscillator pulse from a trigger generator, not shown, is impressed on one of the grids 11 and 12 of tube 5 in place of the target signal, simulating the transmitted pulse of a radar set.

The oscillator uses two separate circuits to produce a pulsed I.-F. current. The first oscillator 6, using a 6AG7 type tube, is set to operate at 45 mc., and is cut off except when a video signal pulse is applied thereto. The second oscillator 7, using a 6AC7 tube, operates continuously at 75 mc.

The outputs of oscillators 6 and 7 are applied together to an inefficient mixer 8, the output of which will be the difference frequency between the two oscillators or 30 mc. This is the desired value for the I.-F. The use of two oscillators 6 and 7 in this fashion reduces R. F. leakage from the modulator into the radar receiver, which was a serious problem in single oscillator trainers. Unless very elaborate shielding measures were employed, 30 mc. carrier leakage currents found their way into the receiver, which tended to saturate, so that the signals could not be seen. Due to the band pass limits of the receiver, 30 mc.±5 mc., neither the 75 mc. nor the 45 mc. currents can produce this effect. Further, since the 45 mc. oscillator is pulsed, the 30 mc. difference frequency will be developed only during reception of the video signals, which is a very small fraction of the time. Hence ordinary R.-F. shielding may be employed. A conventional range attenuation gate circuit, not shown, supplies the range gate bias to the mixer 8 through lead 9.

Simulation of noise normally developed within the radar set, particularly in the pre-amplifier stages, is accomplished through the use of a noise generator 10 using a 6AC7 type tube, the output of which is mixed with the attenuated I.-F. in a separate mixer and pre-amplifier tube 11 of the same type.

If it is desired to simulate fading, a conventionally obtained varying bias control voltage, details of which are omitted from Fig. 2, may be applied to one or both grids of the double triode 5 in the video inverter component 3, as indicated schematically in Fig. 1 at 12.

Returning to the pulsed 45 mc. oscillator 6: the functioning of this Hartley oscillator circuit is controlled by a switch tube circuit 14. The tank inductance 15 of the oscillator circuit 6 constitutes the cathode load on a 6AG7 type tube in the switch tube circuit 14. Normally, the cathode impedance of the switch tube 16 is so low that oscillation in the pulsed circuit 6 is suppressed. When a negative pulse is applied to the control grid 17 of switch tube 16, current ceases to flow therethrough, the cathode impedance increases, and hence 45 mc. oscillations begin to build up in the Hartley circuit 6.

The 45 mc. pulsed oscillator circuit 6 is stabilized by the switch tube circuit 14, since when the cathode 19 swings as negative as the grid 17, current will again flow through the tube 16. Enough energy will thus be absorbed to prevent further increase in the amplitude of the oscillations. A small portion of the 45 mc. oscillations is fed from a plate load resistor 20 to a grid 29 of tube 22 of the mixer circuit 8. This grid 29 is biased to ground potential by means of a small resistor 24, which also filters out any video frequency in the plate circuit of oscillator 6.

The output of 75 mc. local oscillator circuit 7 using a 6AC7 type tube is taken from the grid end of the plate-grid inductance 25 and coupled to control grid 26 of the mixer tube 22 through a coupling capacitor 27.

The mixer circuit 8 operates as an I.-F. amplifier and has three inputs. The 45 mc. output of the pulsed oscillator 6 is applied to the third grid 29 of the 6L7 type tube. The 75 mc. output from the local oscillator circuit 7 is applied to the contril grid 26, which also receives the attenuation with range, gate, voltage received from the trigger unit (not shown) through lead 9 as stated above.

The output of the mixer tube 22 is loosely coupled to the control grid 31 of pre-amplifier stage tube 11 (second I.-F. stage) through a capacitor 32 having a value of substantially 1 micro-microfarad and a larger capacitor 34.

Capacitance 32 attenuates the 30 mc. output of the mixer circuit 8 so that it may be mixed with the output of the noise generating circuit 10. The noise across a 1.5K grid resistor 35 is amplified with a band width of 2.4 mc. by the noise generator tube 37, and is then able to cover such 30 mc. pulses as leak through to the output when the mixer 22 is biased off and to minimize the effect of pickup of external 30 mc. signals by the cable joining the modulator to the radar receiver.

This modulator may also be used with moving target indicator training. Fixed echo signals, already at I.-F., generated in a supersonic trainer, are applied to the control grid 36 of the noise generator tube 37, while the moving target echoes are received in the usual manner.

It will be recognized that the types of tubes and the various circuit constants specified are subject to change as desired, and that other engineering changes in the circuit may be made within the scope of the invention. The trainer as described makes possible the effective training of radar operators by simulating with greater accuracy than heretofore possible the conditions of reception which will be experienced in the field by the trainee.

What is claimed is:

A training device for a pulse echo type radio obstacle detection system having a superheterodyne receiver, comprising a first normally inoperative oscillator circuit having a given characteristic first frequency, a second oscillator having a characteristic second frequency differing from said first frequency by the intermediate frequency of said system, a mixer stage coupled to both of said oscillators for combining the signal frequencies thereof and to produce a signal wave having the said intermediate frequency; an electronic switch circuit for controlling the operation of said first oscillator including a tube and an impedance in circuit therewith, said impedance forming a part of said first oscillator circuit and having a value varying in response to the current therethrough, a signal transducer connected to said controlling circuit and having a connecting means to a source of detection-system-simulating-signal pulses for application of said pulses thereto, whereby said first oscillator becomes operative; an amplifier for translating the pulse signals from said mixer stage connected thereto; means for supplying a noise signal connected to said translating amplifier, and means for applying a signal amplitude controlling voltage to said transducer for control of the pulse amplitudes therein.

EDWARD M. JONES.

REFERENCES CITED

The following references are of record in the file of this patent:

UNITED STATES PATENTS

| Number | Name | Date |
|---|---|---|
| 1,923,345 | Wallace | Aug. 26, 1933 |
| 2,039,405 | Green | May 5, 1936 |
| 2,363,835 | Crosby | Nov. 28, 1944 |
| 2,409,577 | Matson | Oct. 15, 1946 |
| 2,439,169 | Kittridge | Apr. 6, 1948 |
| 2,449,998 | Hansen | Sept. 28, 1948 |
| 2,461,364 | Zappacosta | Feb. 8, 1949 |
| 2,464,252 | Moore | Mar. 15, 1949 |

OTHER REFERENCES

Hess (Abstract Publication), Serial No. 516,942; published August 16, 1949; filed January 4, 1944.